Dec. 16, 1958  A. I. FRANK  2,864,978
CONTROL APPARATUS

Filed Feb. 14, 1956  2 Sheets-Sheet 2

INVENTOR.
ALAN I. FRANK
BY
ATTORNEY.

United States Patent Office 2,864,978
Patented Dec. 16, 1958

2,864,978

CONTROL APPARATUS

Alan I. Frank, Philadelphia, Pa., assignor to Minneapolis-Honeywell Regulator Company, Minneapolis, Minn., a corporation of Delaware Application February 14, 1956, Serial No. 565,400

7 Claims. (Cl. 317—148.5)

Specification of Alan I. Frank for a patent on an improvement in Control Apparatus.

A general object of the present invention is to provide a new and improved control apparatus. More specifically, the present invention is concerned with a circuit for controlling the operation of an electromagnetic relay in accordance with the phase relationship between a control signal and a reference voltage.

Another specific object of the present invention is to provide a new and improved phase discriminating relay control circuit employing a transistor as the control element.

Phase discriminating relay circuits are commonly employed in automatic control and monitoring apparatus to initiate a control operation in response to a control signal of one phase or the opposite phase with respect to a reference voltage. Such automatic control and monitoring apparatus to be acceptable, however, must be adapted to operate in such a manner, that upon the failure of any component, the controller will function to prevent the controlled or monitored variable from assuming an unsafe value.

It is therefore a specific object of the present invention to provide a phase sensitive relay control circuit adapted for safe failure upon the failure of any of its components.

Transistor phase discriminators are generally arranged with the load and reference voltage connected in series with the transistor output electrodes. The load current is then controlled by a control signal applied across the transistor input electrodes. While such a configuration is adequate for many applications it has the inherent unsafe failure characteristic that short circuiting of the transistor output electrodes will cause permanent energization of the load.

Still another specific object of the present invention is to provide a transistor phase discriminating circuit in which the transistor is operated as a synchronous switch connected in shunt across the load and controlled by the reference voltage applied to the transistor input electrodes.

A further object of the present invention is to provide a transistor phase discriminator adapted to control the charging and discharging of a capacitor in order to effect discharge through the discriminator load when the phase of the capacitor charging current bears the proper relationship to discriminator reference voltage.

The various features of novelty which characterize this invention are pointed out with particularly in the claims annexed to and forming part of this specification. For a better understanding of the invention, its advantages, and the specific object obtained with its use, reference should be had to the accompanying drawings and descriptive matter in which are illustrated and described preferred embodiments of this invention.

Figure 1:
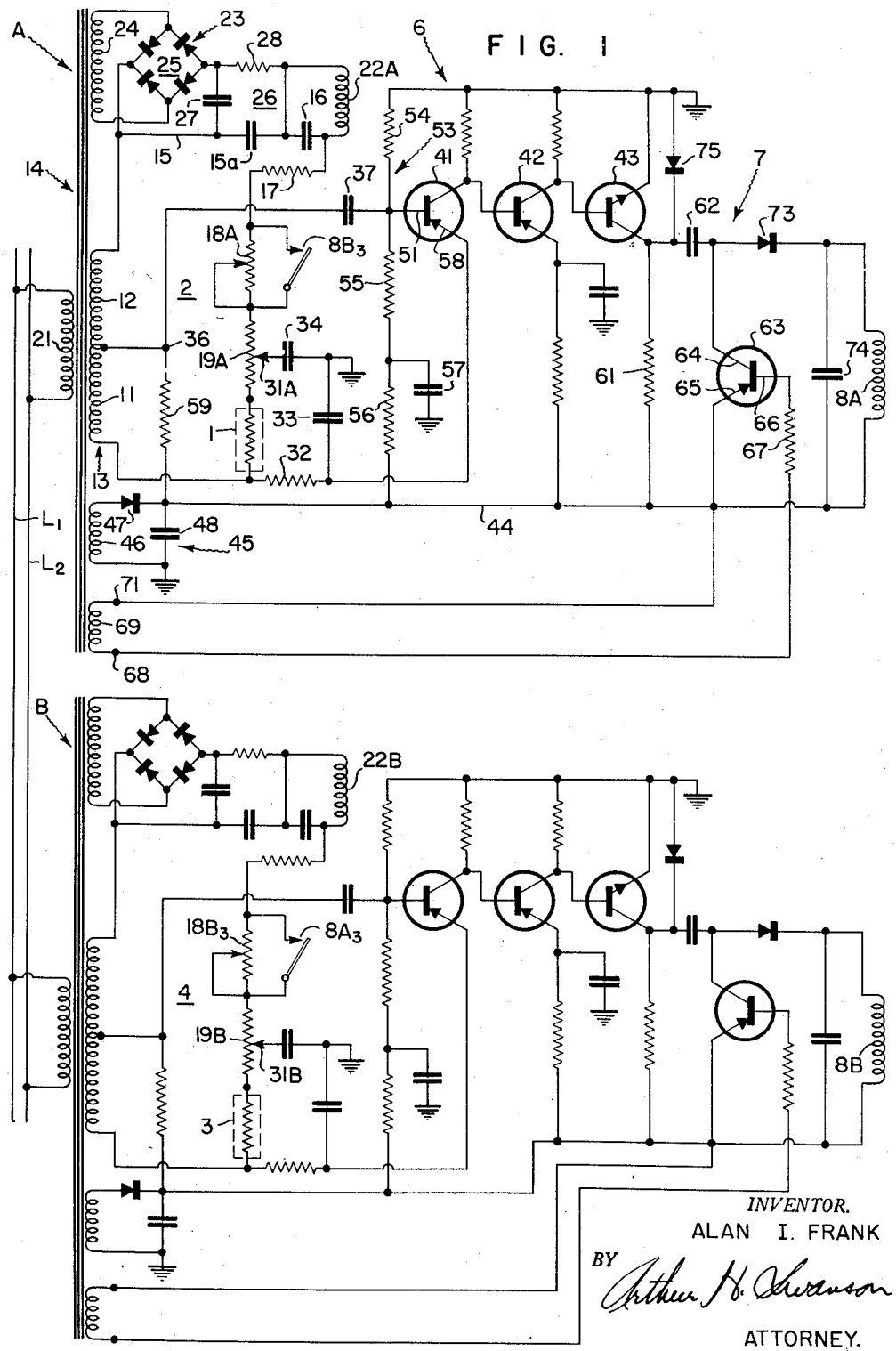
Fig. 1 is a circuit diagram of a monitoring apparatus utilizing the phase discriminating circuit of the present invention to control the channel control relays employed therein.

Referring now to Fig. 1, there is shown a circuit diagram of a monitoring apparatus adapted to monitor a temperature and to perform a control function upon the occurrence of a predetermined high temperature. A typical application for a monitor of this type could be the monitoring of the temperature of a bearing in a piece of rotating machinery. This monitor employs two identical monitoring channels, A and B, to monitor the same temperature. Both of these channels employ a thermistor connected as an arm of an electrical bridge circuit as a temperature sensing element. Channel A employs a thermistor 1 connected as an arm of a bridge circuit 2 for its temperature sensing element, and similarly, channel B employs a thermistor 3 connected as an arm of the bridge circuit 4 as its temperature sensing element. In operation, the thermistors 1 and 3 are positioned with respect to the process or apparatus being monitored, in such a way that they both will respond to the temperature of interest. Since the channels A and B are identical in construction and operation, the discussion which follows will be confined, with the exception of channel interconnections and cross checking features, to the construction and operation of channel A.

As shown, the output of the bridge circuit 2 of channel A is connected to the input of a three stage transistor amplifier generally designated as 6. The amplifier 6 amplifies the output of the bridge circuit 2 and applies it to the input of a transistor phase discriminator 7 which is operative to control the operation of a control relay 8A. In addition to the thermistor 1, the bridge circuit 2 comprises a pair of winding sections 11 and 12 of a secondary winding 13 of a transformer 14, a conductor 15, a capacitor 15A, a capacitor 16, a resistor 17, an adjustable resistor 18A, and an adjustable set point resistor 19A. The bridge circuit 2 is energized by means of the secondary winding 13 of the transformer 14 which has a primary winding 21 connected across a suitable source of alternating current, shown here as the conductors $L_1$ and $L_2$.

The bridge circuit 2 has been designed to provide safe failure operation upon the occurrence of a failure of any of the components of the bridge circuit. To this end, a relay 22 has been provided to cause a safe failure in the event of an open circuit in the thermistor 1. The relay 22 is energized from a source of direct current 23 which comprises a secondary winding 24 of the transformer 14, a full wave bridge rectifier 25, and a filter 26. The filter 26 includes a capacitor 27 and a resistor 28.

The adjustment of a sliding contact 31A on the set point resistor 19A determines the temperature of the thermistor 1 at which the bridge circuit 2 will have a null. A resistor 32 shunts the thermistor 1 through capacitors 53 and 54 and thus linearizes the bridge sensitivity over its operating range. The phase of the bridge output signal will change by 180° across the bridge null and, therefore, the phase of that signal will indicate a high or low temperature with respect to the set point. The output of the bridge circuit 2 is across the sliding contact 31A of the set point resistor 19A and a junction 36 of the secondary winding sections 11 and 12.

The output of the bridge circuit 2 is coupled by means of the capacitor 37 to the input of the amplifier 6. The amplifier 6 employs transistors 41, 42, and 43 as its amplifying elements. The first two stages of the amplifier 6 are conventional direct coupled amplifier stages with pnp junction transistors. The third amplifier stage is a direct coupled npn junction transistor stage. The amplifier 6 is energized through a conductor 44 from a direct current power supply 45 which comprises a transformer secondary winding 46, a diode rectifier 47, and a filtering capacitor 48. The base 51 of the transistor 41 is connected to a base stabilizing voltage divider 53 comprising a pair of resistors 54 and 55 connected in series. The voltage divider 53 is connected to the power supply 45 by means of the conductor 44 and an additional filtering section comprising a resistor 56 and a capacitor 57.

To provide an additional safe failure characteristic, the thermistor shunting resistor 32 has been connected in the emitter circuit of the transistor 41 of the first amplifier stage. The emitter circuit of the transistor 41 can be traced from the emitter 58, through the resistor 32, the transformer secondary winding section 11, and a resistor 59 to the power supply 45. The capacitor 33, in addition to connecting the shunting resistor 32 across the thermistor 1, bypasses the resistor 32 to ground and thereby prevents degeneration across the resistor 32.

The output of the amplifier 6 appears across a resistor 61 in the emitter circuit of the transistor 43. The signal appearing across the resistor 61 is coupled to the input of the phase discriminator 7 by means of a capacitor 62. The phase discriminator 7 employs a pnp junction transistor 63 as a synchronous switch. Accordingly, the collector 64 of the transistor 63 is connected to the capacitor 62 and the emitter 65 of the transistor 63 is connected to the other terminal of the resistor 61. The base 66 of the transistor 63 is connected by means of a resistor 67 to one end terminal 68 of a secondary winding 69 of the transformer 14. The other end terminal 71 of the transformer secondary winding 69 is connected to the emitter 65 of the transistor 63. The resistor 67 limits the base current drawn by the transistor 63.

The voltage across the secondary winding 69 controls the switching action of the transistor 63. A diode 73 is connected in series with the control relay 8A across the emitter-collector circuit of the transistor 63. The control relay 8A is a polarized relay designed for energization only when current flows in the low impedance direction of the diode 73. The diode 73 is included in the circuit to provide additional safe failing characteristics and to permit a capacitor 74 to be connected in shunt across the control relay 8A to prevent relay chatter. It should be noted, that in applications where relay chatter is not objectionable, the diode 73 can be eliminated. As shown, a Zener diode 75 is connected across the emitter-collector circuit of the transistor 43 in the last stage of the amplifier 6. This diode prevents the voltage across the emitter-collector circuit of that transistor from exceeding the permitted voltage rating of that transistor when such a voltage is developed across the transistor as a result of the switching action of the transistor 63.

Figure 2:
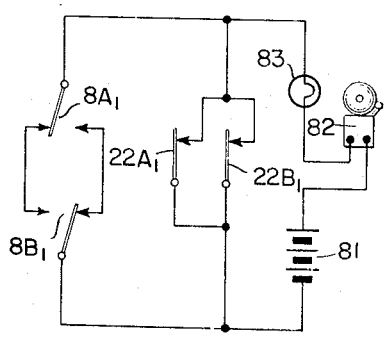
Fig. 2 is a circuit diagram of the alarm circuit employed in the monitor of Fig. 1.

Referring now to Fig. 2, there is shown a circuit diagram of the alarm circuit employed in the monitor of Fig. 1. All relay contacts are shown in their de-energized positions. As mentioned previously, channel B is identical in construction to channel A and accordingly includes a control relay 8B and an open thermistor sensing relay 22B. As shown, the alarm circuit includes a source of alarm energizing current, shown here as a battery 81, an audible alarm means, shown here as a bell 82, and a visual alarm means, shown here as a lamp 83. In the operation of the monitor of Fig. 1, all of the relays associated with the monitoring channels are energized under normal operating conditions. Accordingly, the contacts associated with these relays are open when the relays are energized.

The alarm circuit has been arranged so that the bell 82 and the lamp 83 will be energized upon the de-energization of the open thermistor detection relay of either channel. Accordingly, the contacts $22A_1$ of relay 22A of channel A and the contacts $22B_1$ of the relay 22B of channel B are connected in parallel across the series connected battery 81, bell 82, and lamp 83. In addition, the de-energization of either of the monitoring channel control relays will cause the energization of the alarm circuit. To this end, the contacts $8A_1$ of the control relay 8A of channel A and the contacts $8B_1$ of the control relay 8B of channel B are interconnected as shown so that the de-energization of either control relay without the simultaneous de-energization of the other control relay will cause energization of the alarm means.

Figure 3:
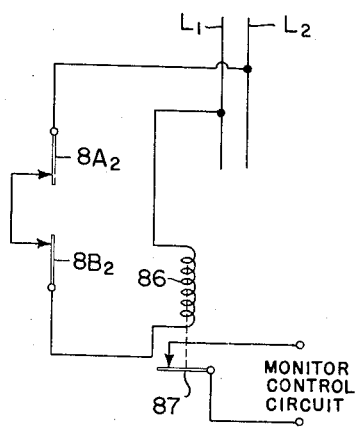
Fig. 3 is a circuit diagram of the control circuit employed in the monitor of Fig. 1.

Referring now to Fig. 3, there is shown a circuit diagram of the control circuit employed in the monitor of Fig. 1. Again, all relay contacts have been shown in their de-energized positions. This circuit utilizes a relay 86 having a pair of contacts 87 to perform the monitor control operation. As shown, the coil of the relay 86 is connected across an appropriate source of alternating current, shown here as the conductors $L_1$ and $L_2$, through the contacts $8A_2$ and $8B_2$ of the channel control relays 8A and 8B respectively. It should be noted, that the contacts $8A_2$ and $8B_2$ are in series and that both contacts must be closed before the monitor control relay 86 is energized.

In addition to the contacts just described, each of the channel control relays has an additional set of contacts which are employed to connect into the bridge circuit of the other channel a small resistor which tends to lower the set point of that bridge a few degrees. To this end, the relay control 8B of channel B as set of contacts $8B_3$ connected across the resistor 18A in the bridge circuit 2 of channel A. Similarly, the control relay 8A of channel A has a set of contacts $8A_3$ connected across the resistor 18B in the bridge circuit 4 of channel B. When the control relays are energized, the resistors 18A and 18B are shorted out of their respective bridge circuits through these contacts. However, when the relays are de-energized these resistors are connected into their respective bridge circuits and are positioned in the bridge circuits in such a manner as to lower the bridge set point by an amount proportional to the relationship their resistance value bears to the other bridge parameters.

The monitor of Fig. 1 has been designed to provide almost complete safe failing characteristics. To this end, a cross channel check is provided. The channel control relays 8A and 8B are normally energized when the thermistors 1 and 3 indicate a temperature below the set point. As the temperature being monitored approaches the set point temperature, either relay 8A or 8B will be de-energized before the other due to small differences in the circuit elements. Assume that the relay 8A is de-energized first. Circuit operation is the same for either relay 8A or 8B being de-energized first.

When the relay 8A is de-energized, the contacts $8A_1$ will transfer giving an alarm, the contacts $8A_2$ will close but will not energize the main control relay because the contacts $8B_2$ are still open, and the contacts $8A_3$ will open lowering the set point of the bridge 4 of channel B. The shift in the set point of the bridge 4 of channel B will cause the channel control relay 8B to be de-energized. When the channel control relay 8B is de-energized, the contacts $8B_1$ will transfer opening the alarm circuit, contacts $8B_2$ will close energizing the main control relay, and the contacts $8B_3$ will open lowering the set point of the bridge circuit 2 of channel A. If the temperatures of the thermistors 1 and 3 go above the set point temperature, the channel control relays 8A and 8B will remain de-energized. If after the relay 8A is de-energized and the relay 8B fails to deenergize, the main control relay will not be energized and a continuous alarm will be signalled.

In considering the operation of the monitor shown in Fig. 1, it should be noted that the adjustment of the sliding contact 31A on the set point resistor 19A in the bridge circuit 2 of channel A determines the temperature at which the thermistor 1 will cause the bridge circuit 2 to have a null. Similarly, the adjustment of the sliding contacts 31B on the set point resistor 19B of the bridge 4 of channel B will determine the temperature at which the thermistor 3 will cause the bridge circuit 4 to have a null. In most applications, the set point of the two bridges will be identical, and accordingly, the set point adjustments of these bridges may be ganged.

In operation, the phase of the bridge output voltage of both channels is such as to maintain the control relays associated therewith energized until the bridge set point is exceeded. Accordingly, any malfunction of the bridge, amplifier, or phase discriminator, causing a loss of the bridge output signal will cause the relay associated therewith to be de-energized and due to the cross channel check to be indicated by an alarm. The resistance of the thermistor temperature sensing element decreases with increasing temperature, and the phase of the bridge output voltage changes by 180° as the bridge set point is passed. The monitor shown in Fig. 1 is arranged to detect a high temperature and therefore the phase of the bridge output voltage of both channels is arranged with respect to the phase discriminator reference voltage to maintain the control relay energized until the resistance of the thermistor decreases to a value which causes phase reversal.

Figure 4:
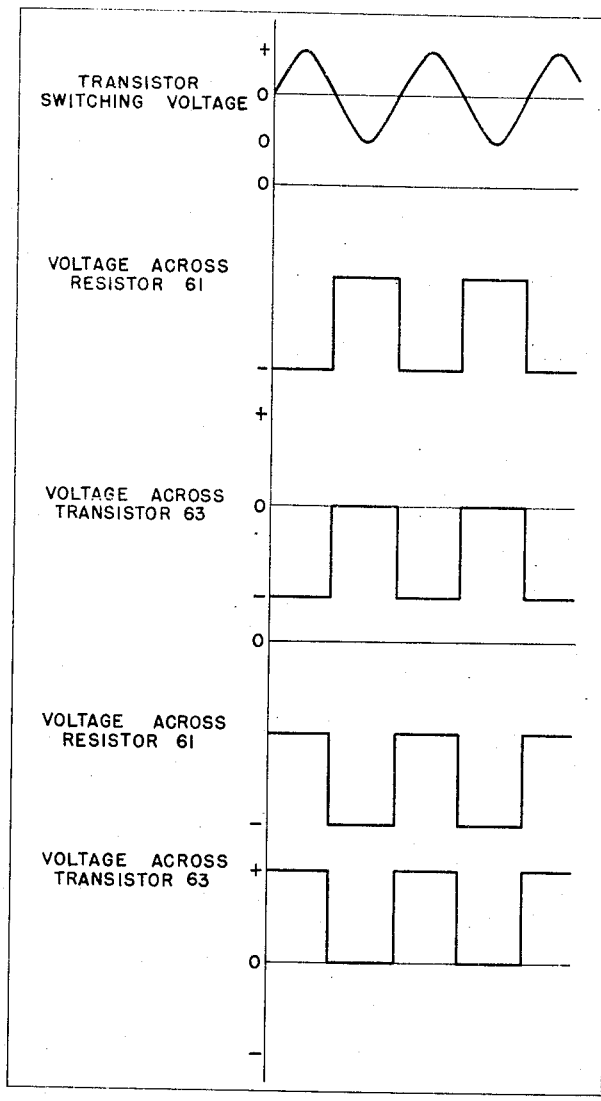
Fig. 4 is a table showing the phase relationships of the voltages appearing across various sections of the phase discriminating circuit of the present invention.

In considering the operation of the phase discriminator employed in the monitor of Fig. 1, reference should be had to Fig. 4 which is a table showing the phase relations of the voltages across various parts of that circuit. The output of the amplifier 6 appears across the resistor 61 in the collector circuit of the transistor 43 in the last amplifier stage. Due to the gain and the limiting action of the amplifier 6, the transistor 43 is driven in such a manner that it can be considered to be a switch causing a square wave output to be produced across the resistor 61 as it is alternately driven conductive and non-conductive. For the purpose of this explanation, the voltage level of the conductor 44 has been taken as the reference voltage. As shown in Fig. 4, the collector of the transistor 43 goes highly negative as the transistor 43 conducts and returns to a less negative value, determined by the break-down voltage of the Zener diode 75, when the transistor 43 is non-conductive. The phase of the resulting negative pulses with respect to the switching voltage applied to the emitter-base circuit of the transistor 63 of the phase discriminator 7, controls the operation of the relay 8A.

The transistor 63 is operated as a synchronous switch. When the base 66 is negative with respect to the emitter 65, the transistor may be considered to be a closed switch with a very low voltage drop between the collector and emitter terminals. When the base 66 is positive with respect to the emitter 65, the transistor 63 can be considered to be an open switch with very low leakage between the collector and emitter terminals. During the half cycle of the transistor switching voltage that the transistor 63 can be considered to be a closed switch, the capacitor 62 is connected directly across the resistor 61 and is charged to the voltage appearing across that resistor. Accordingly, if the phase of the amplifier output voltage with respect to the phase discriminator switching voltage is such that the transistor 63 is a closed switch during the half cycle that the transistor 43 is non-conductive, the capacitor 62 is charged to the voltage appearing across the resistor 61 due to the current flow through the Zener diode 75. During the next half cycle, when the transistor 63 is an open switch and the transistor 43 is conductive, the charge on the capacitor 62 subtracts from the voltage developed across the resistor 61 leaving a net voltage across the emitter collector circuit of the transistor 63 of such a polarity that current would flow through the relay 8A if it were not for the diode 73.

When, however, the phase of the amplifier output voltage with respect to the phase discriminator switching voltage is such that the transistor 63 is a closed switch during the half cycle that the transistor 43 is non-conductive, the capacitor 62 is charged to the voltage appearing across the resistor 61 due to the current flow through the transistor 43. During the next half cycle, when the transistor 63 is an open switch and the transistor 43 is non-conductive, the voltage developed across the resistor 61, due to the current flow through the Zener diode 75, subtracts from the voltage across the capacitor 62 leaving a net voltage of such a polarity that the condenser 62 is discharged through the relay 8A. Accordingly, when this phase relationship exists, the relay 8A is energized with pulses of positive current. The relay 8A is polarized and will be energized only on such positive current pulses. The diode 73 in series with the relay 8A allows an integrating capacitor 74 to be placed across the relay 8A to prevent relay chatter.

The phase discriminator of the present invention has been designed to provide as many safe failure features as possible. To this end, it should be noted that the phase discriminator 7 is not a conventional circuit. Several novel features have been employed to achieve the desired safe failure operation. In a conventional transistor phase discrimination, for example, the load is generally connected in series with the reference voltage and the output electrodes of the transistor. While such a configuration is adequate for many applications it has the inherent unsafe feature that a short across the output electrodes of the transistor will cause permanent energization of the load. In the phase discriminator of the present invention, the reference voltage is applied to the input electrodes of the transistor and the load is connected in parallel with the transistor output electrodes. In this manner a shorting of the transistor output electrodes cannot result in relay energization.

The following is a table of additional phase discriminator safe failure characteristics:

| Component | Failure | Result |
| --- | --- | --- |
| Capacitor 62 | open | There would be no signal to the channel control relay de-energizing it. |
| | short | The channel control relay will de-energize. The transistor 63 will short the resistor 61 every half cycle. |
| Diode 73 | short | The capacitor 74 across the channel control relay cannot hold a charge, therefore, the relay will de-energize. |
| | open | There would be no signal into the channel control relay, de-de-energizing it. |
| Capacitor 74 | short | The channel control relay will de-energize. |
| | open | The channel control relay will either chatter or de-energize, both will signal an alarm. |
| Transistor 63 | Collector shorted to base. | The relay will de-energize when the bridge is at its null. |
| | Open collector | The discriminator will not function and there will be no energizing voltage across the relay. |
| | Collector shorted to emitter. | The discriminator will be shorted and the relay will be de-energized. |
| | Open emitter | All discriminator action will be lost and the relay will be de-energized. |
| | Open base | The relay will de-energize except at high temperatures. |
| Resistor 67 | short | The discriminator transistor will fail and de-energize the relay. |
| | open | The relay will de-energize, except at high temperatures. |

It should be noted that, while the phase discriminating circuit of the present invention has been shown adapted to energize a polarized relay, it is within the scope of the present invention that it be used to energize any other suitable circuit load. It also should be noted, that while the transistor employed in this circuit has been shown as a pnp junction transistor that with suitable changes in circuit polarities, an npn junction transistor could be employed.

Subject matter disclosed but not claimed herein is being disclosed and claimed in the co-pending application of Thomas A. Patchell and Robert Mayer and the co-pending application of Kenneth H. Beck, filed on even date herewith and assigned to the same assignee.

While, in accordance with the provisions of the statutes, there has been illustrated and described the best form of the embodiments of the invention now known, it will be apparent to those skilled in the art that changes may be made in the form of the apparatus disclosed without departing from the spirit of the invention as set forth in the appended claims and that in some instances certain features of the invention may be used to advantage without a corresponding use of other features.

Having now described this invention, what is claimed as new and that which it is desired to secure by Letters Patent is:

1. In combination, a pair of terminals adapted to be connected to a first source of alternating current, a circuit connected to these terminals comprising a capacitor, a diode, and a relay connected in series, a transistor having an emitter, a collector, and a base, a circuit connecting said emitter and said collector in series with said capacitor between said terminals, and means adapted to connect the emitter-base circuit of said transistor to a second source of alternating current, said first source of alternating current having a reversible phase with respect to said second source of alternating current.

2. A safe failing phase sensitive relay control circuit adapted to control a polarized relay comprising, in combination, a transistor operated as a synchronous switch, said transistor having an emitter, a collector, and a base, a pair of terminals adapted to be connected to a source of pulsating unidirectional current, the emitter of said transistor being connected to one of said terminals, a capacitor coupling the collector of said transistor to the other of said terminals, means connecting the emitter-base circuit of said transistor to a source alternating current for controlling the conductivity of the emitter-collector circuit of said transistor and hence the charging of said capacitor, and a polarized relay connected across the emitter-collector circuit of said transistor, the pulsations of said unidirectional current having a reversible phase with respect to said alternating current.

3. A phase sensitive relay control circuit comprising, in combination, a transistor having an emitter, a collector, and a base, a polarized relay, means connecting said polarized relay across the emitter-collector circuit of said transistor, said relay being poled for operation when current passes through it in a direction toward the transistor emitter, means connecting the emitter-base circuit of said transistor to a source of reference voltage, a pair of terminals adapted to be connected to a source of relay control voltage having a reversible phase with respect to said reference voltage and a capacitor connecting the collector circuit of said transistor to one of said terminals, the emitter of said transistor being connected to the other of said terminals.

4. In combination, a transistor having an emitter, a collector, and a base, a pair of terminals adapted to be connected to a source of alternating control voltage, a capacitor coupling the collector of said transistor to one of said pair of terminals, the emitter of said transistor being connected to the other of said terminals, a polarized relay connected across the emitter-collector circuit of said transistor, a second pair of terminals adapted to be connected to a source of alternating reference voltage, and means connecting the emitter-base circuit of said transistor to said second pair of terminals, said control voltage having a reversible phase with respect to said reference voltage.

5. A circuit for operating a relay comprising, in combination, a transistor having an emitter, a collector, and a base, a pair of terminals adapted to be connected to a source of alternating control voltage, a capacitor connecting the collector of said transistor to one of said terminals, the emitter of said transistor being connected to the other of said terminals, a diode and a relay connected in series between said collector and said emitter, said diode being poled to prevent current flow into said collector, a capacitor connected in shunt across said relay, and means adapted to connect the emitter and base of said transistor to a source of alternating reference voltage, said control voltage having a reversible phase with respect to said reference voltage.

6. A circuit for supplying a pulsating unidirectional current to a load comprising a transistor connected as a synchronous switch with its emitter-collector circuit in shunt across said load, means connecting the emitter-base circuit of said transistor to a source of alternating current of a fixed phase, and a pair of terminals adapted to be connected to a source of pulsating unidirectional current having a polarity opposite to the polarity of the pulsating unidirectional current desired to be supplied to said load and having a reversible phase with respect to said alternating current, and a capacitor coupling the collector of said transistor to one of said terminals, the emitter of said transistor being connected to the other of said terminals.

7. A phase discriminating circuit comprising in combination a first pair of terminals adapted to be connected to a source of alternating current of a fixed phase, a second pair of terminals adapted to be connected to a source of pulsating current having a reversible phase with respect to said alternating current, a capacitor, a transistor having an emitter, a collector, and a base, said capacitor coupling the emitter-collector circuit of said transistor to said second pair of terminals, a load connected across said emitter-collector circuit, and means adapted to connect the emitter-base circuit of said transistor to said first pair of terminals.

References Cited in the file of this patent

UNITED STATES PATENTS 2,511,680    Warrington  ----------- June 13, 1950